Feb. 22, 1955
W. J. PERRY
2,702,579
MACHINE FOR FABRICATING BIAS-CUT TIRE FABRIC
Filed Feb. 26, 1953
3 Sheets-Sheet 1
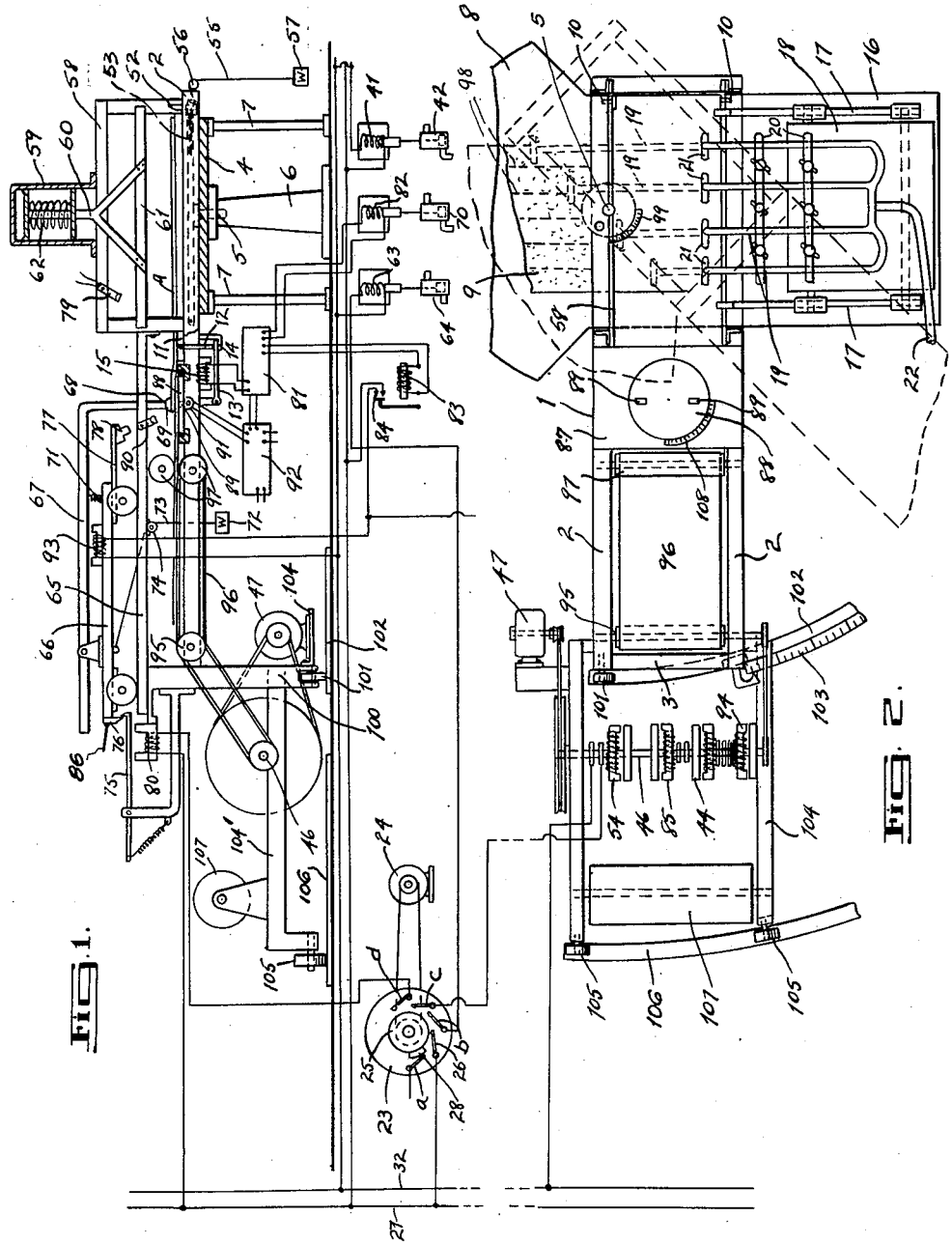
INVENTOR
William J. Perry
BY
Douglas S. Johnson
ATTY.

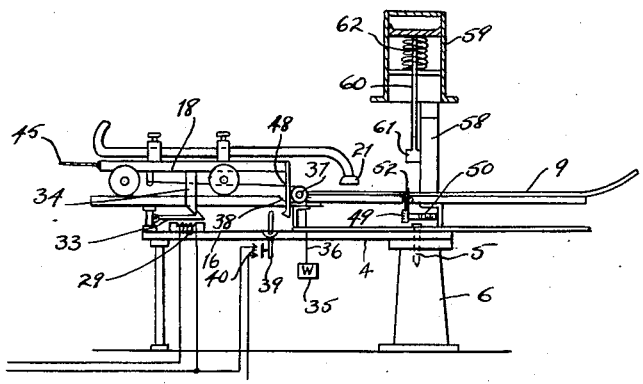
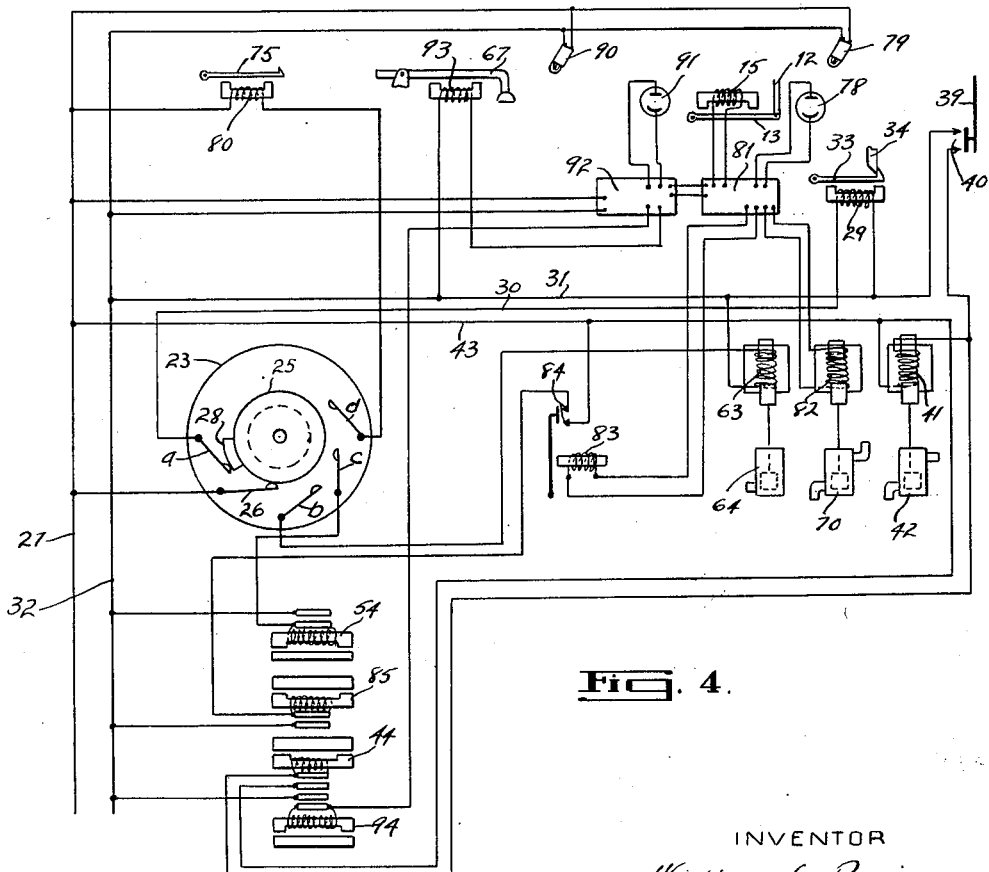

United States Patent Office 2,702,579
Patented Feb. 22, 1955

2,702,579

MACHINE FOR FABRICATING BIAS-CUT TIRE FABRIC

William J. Perry, Toronto, Ontario, Canada

Application February 26, 1953, Serial No. 338,988

12 Claims. (Cl. 154—1)

This invention relates to improvements in machines of the type disclosed in my United States Patent 2,331,342 of October 12, 1943, for Bias-Cutting Tire Fabrics and Splicing the Bias-Cut Fabrics Into a Continuous Strip.

The principal object of the invention is to provide an improved and simplified machine which will completely automatically cut the fabric stock on any desired bias, then splice it to a preceding bias cut strip with the spliced strips in accurate alignment forming a continuous web to be wound up ready for use in tire fabrication.

Another main object is to enable the angle of the bias to be varied in a simple and easy manner and substantially without interruption of the machine operation.

The principal feature of the invention resides in providing an improved arrangement of mechanisms co-operating to automatically cut the stock on a bias after it has been advanced laterally on to a horizontal feed table in correct starting position to be fed along the table, and to then advance the bias cut stock strips or pieces in a linear straight line motion along the feed table on a predetermined path parallelling the direction of the bias cut to be accurately aligned with and lapped over the trailing edge of a preceding piece and secured thereto, the cut and re-connected stock pieces thus forming a new continuous web of bias construction to be wound off the machine.

With this arrangement the cut stock strips move in a straight line directly from their point of severance to their point of re-connection with the preceding strip, enabling accurate alignment and providing for a simplified feed.

According to the preferred form of the invention the cutting, advancing and splicing mechanisms are all mounted directly on the feed table assembly, and a further important feature resides in pivotally supporting the table assembly to rotate, preferably about a point centered on the path of movement of the stock being laterally fed on to the table, whereby the bias angle can be varied at will without upsetting the co-operative relation of the mechanisms carried by the table.

Other features of the invention reside in the novel construction and co-operation of the various parts of the machine, as will be understood from the following description taken in conjunction with the accompanying drawings in which:

Figure 1 is a side elevational view in somewhat diagrammatic form of a machine constructed in accordance with the present invention with one side being partly broken away.

Figure 2 is a plan view of the machine shown in Figure 1.

Figure 3 is an enlarged end elevational view of the machine of Figure 1.

Figure 4 is a wiring diagram of the various electrical components of the machine.

Figure 5:
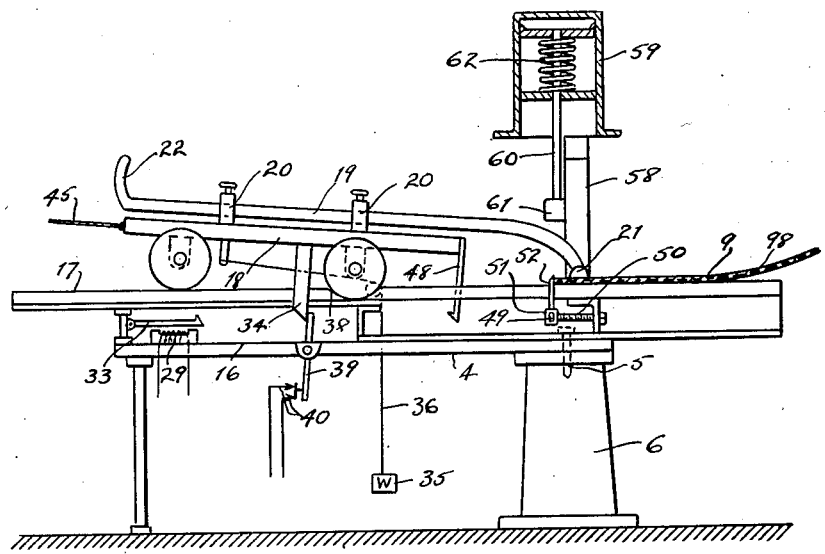
Figure 5 is a view similar to Figure 3 but on an enlarged scale and showing the original fabric stock about to be advanced onto the feed table assembly.

In the manufacture, for instance, of rubber tires it is the present practice to fabricate a web of material of parallelly arranged cords lightly interlaced with a thin weft thread and bonded by a rubber coating calendered on both sides. Such a web of fabric is bias-cut into strips of a selected width in accordance with the size of the tire to be made.

My previous Patent 2,331,342 discloses a machine which will bias-cut strips of fabric from the web and then join the bias-cut strips into end-to-end relation to form a new web which will be of bias construction.

The present invention is to provide a simplified machine for this purpose which will enable the severed fabric to be more easily handled.

With reference to the drawings, the machine comprises a table assembly 1 formed of suitably connected longitudinal angle members 2 suitably connected by cross braces 3 and mounted to rotate on a platform 4 adjacent one end and at one side thereof about a pivot 5. The platform 4 is supported by a central post 6 into which the pivot bolt 5 extends and auxiliary posts 7.

The table 1 carries a diverging apron 8 symmetrically disposed relative to the pivot 5 and onto which the stock 9, comprising an uncured corded rubber or like fabric web, is fed in its delivery to the machine.

Pivoted on pivots 10 between the longitudinal frame bars 2 is a table surface or plate 11. The end of the plate 11 remote from the pivots 10 is supported by a bar 12 carried by an arm 13 pivotally supported from the table assembly 1. A bracket 14 limits downward movement of the arm 13 and an electro-magnet 15 is arranged to lift the arm 13 and swing the plate 11 about its pivots 10 when energized.

Arranged at the side of the table 1 opposite to the apron 8 is a platform extension 16 carrying tracks 17 on which a trolley 18 is mounted to move in a direction laterally of the table 1. The trolley 18 carries longitudinal tubular members 19 slidably mounted in clamp brackets 20 and terminating in downturned ends fitted with suction cups 21. The suction cups are connected to a suitable suction source through the members 19 and hose connection 22.

The machine operation is controlled by a timing device 23, Figures 1 and 4, driven by a motor 24. The timing device 23 comprises a revolving switch mechanism having a ring 25 on which rides a contact 26 connected to one side 27 of a supply line.

The ring or rotor 25 carries a contact projection 28 adapted to successively engage contacts a, b, c, and d. When contact 28 engages contact a, as shown in Figure 4, electro-magnet 29 is energized through leads 30 and 31.

Energization of the electro-magnet 29 operates a latch 33 engaging an arm 34 carried by the trolley 18, as shown in Figure 3, allowing the trolley to move to the right to the position of Figure 5 under pull of the weight 35 connected to the trolley by a cable 36 passing over a pulley 37.

When the trolley moves to the right its front wheels drop into notches 38 in the track 17 to bring the suction cups 21 down on the stock 9. At the same time arm 34 strikes a pivotal arm 39 closing contacts 40 energizing the electro-magnet 41 of a magnetically operated air valve 42 connected across the leads 31 and 43 connected to opposite sides of the line.

The air valve 42 operates to apply suction to the cups 21 which pick up the leading edge of the stock 9. At the same time a magnetic clutch 44 connected in parallel with the electro-magnet 41 is energized to wind in a cable 45 carried by the trolley 18 on a suitably located wind-up (not shown) coupled to the shaft 46 driven by the motor 47 by the clutch mechanism 44.

Winding up of the cable 45 effects movement of the trolley 18 to the left until an arm 48 carried by the trolley strikes the pivotal arm 39 opening the contacts 40 and the trolley then returns under pull by the weight 35 to the position of Figure 3 where it engages the latch 33 which has been released upon the de-energization of the electro-magnet 41 on opening of the contacts. Simultaneously upon opening of the contacts 40 air will be cut off from the suction cups 21, and the fabric, which has been pulled to the extreme left, as shown in Figure 3, will be released and will drop under its own weight onto the table surface of plate 11 prior to the return of the trolley to the right to its latch position, as shown in Figure 3.

Carried by the right-hand longitudinal frame member

2, Figure 3, is a rail 49 spaced inwardly from the frame member 2 by spacing bolts 50 and on this rail operates a slide 51, Figure 5, which carries a knife 52. The knife operates longitudinally of the table on the rail 49 and its slide 51 is connected to a cable 53, Figure 1, which is adapted to be wound onto a wind-up not shown controlled by a magnetic clutch 54.

Connected to the opposite side of the slide 51 by a cable 55 passing over a pulley 56 is a weight 57.

Mounted on the right-hand longitudinal frame member 2, as shown in Figures 3 and 5, is an upright support frame 58 carrying an air cylinder 59, the piston rod of which, indicated at 60, carries a clamp bar 61 which is spring-urged upwardly by a spring 62.

Following the feed of the stock 9 generally transversely of the table assembly 1 to the position of Figure 3 contact 28 is rotated to engage contact $b$ energizing an electro-magnet 63 controlling an air valve 64 connected (connections not shown) to supply air pressure to the cylinder 59 to cause the clamp bar 61 to descend and clamp the stock 9. Then contact 28 makes contact with contact $c$ energizing the magnetic clutch 54 to pull the knife 52 longitudinally of the table assembly to cut a strip from the end of the continuous web of stock.

Following the clearing of the contact 28 from the contact $c$ magnet clutch 54 is de-energized and the weight 57 returns the knife 52 to the position of Figure 1, ready for the subsequent advance of the stock 9 laterally onto the table.

Mounted above the table assembly and extending longitudinally thereof are rails 65 on which operates a trolley 66 carrying a pivotally supported tubular arm 67 having a rotatable head 68 carrying suction cups 69 connected to a suitable air source through the tubular arm 67 through a magnetically operated air valve 70, the complete air circuit not being shown.

The arm 67 is biased upwardly by a spring 71 and is urged to the right, as seen in Figure 1, by a weight 72 connected to the trolley by a cable 73 passing over a pulley 74.

A latch 75 carried from the rails 65 is spring-urged to engage an arm 76 carried by the trolley 66. Projecting from the trolley 66 is an arm 77 carrying a photoelectric cell 78, while mounted on the upright frame 58 is a light source 79 directing light on the surface of the plate 11 which is polished and highly reflecting.

In the next sequence of operation following cutting of the stock 9 contact 28 makes contact $d$ energizing an electro-magnet 80 which operates latch 75 to release trolley 66 which runs to the right in Figure 1 until its photocell 78 arrives at a point where light reflections from the table surface 11, due to the light source 79, are cut off by the stock strip which has just been cut off from the web.

Figure 6:
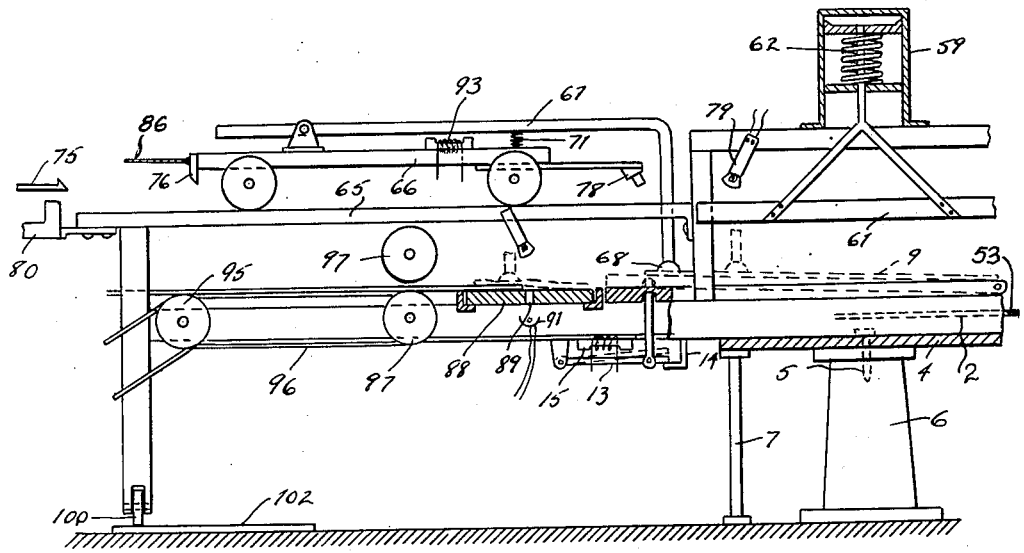
Figure 6 is an enlarged fragmentary longitudinal sectional view showing the manner in which the severed stock pieces are advanced longitudinally of the feed table assembly.

Upon cutting off of the light the photocell 78 transmits a signal to an amplifier relay 81, shown in Figure 4 particularly, which energizes the electro-magnet 15 to operate the table surface or plate 11 about its pivots 10, as shown in Figure 6, to force the stock against the suction cups 69 which are in the extreme right-hand dotted line position of Figure 6. At the same time a signal is applied from the amplifier relay 81 to energize the electro-magnet 82 of the air valve 70 to apply suction to the cups 69 so that the cut stock strip is securely held thereby.

Additionally amplifier relay 81 energizes an electro-magnet 83, making contacts 84, energizing a magnetic clutch 85 connected to wind up a cable 86 carried by the trolley 66 (the wind-up mechanism being omitted for simplicity) to return the trolley to the left, as shown in Figures 1 and 6, with an intermediate return position of the trolley being shown in full lines in Figure 6.

With this arrangement the stock strip 9 is carried to the left with the leading edge held above the table assembly 1.

Rotatably supported on a support 87 is a turntable 88 having aligned slots 89 therein. Directing light through these slots is a light source 90 which shines on a photocell 91 arranged below the turntable and connected to an amplifier relay 92.

Upon the trolley moving to the left to a position where the stock carried thereby overlaps the slots 89 and the trailing edge of a previously advanced strip, the light to the photo-cell 91 is cut off imparting a signal to the amplifier relay 92. This signal is coupled through the amplifier relay 81 to de-energize the relay circuit (not shown) of amplifier relay 81 to effect de-energization of electro-magnet 83, releasing magnetic clutch 85 and effecting de-energization of electro-magnet 82 of the air valve 70 to cut off suction. At the same time amplifier relay 92 energizes an electro-magnet 93, Figures 1, 4 and 6, drawing arm 67 downwardly to force the leading edge of the strip carried by its suction cups 69 against the trailing edge of a previously advanced strip whereupon the tacky uncured rubber of the strips will cohere to effect a connection or splicing thereof. At the same time amplifier relay 92 energizes a magnetic clutch 94 suitably connected to operate roller 95 from the shaft 46 driving conveyor belt 96 and feed rollers 97 through which the web formed by the cohered stock strips is fed, with the rollers 97 further compressing the overlapped ends of the adjoining cohered fabric or stock strips to complete their adhesion.

The new web formed by the strips is fed forwardly until the trailing edge of the last strip carries past the slots 89 whereupon light from the source 90 strikes the photocell 91 de-energizing the magnetic clutch 94, stopping feed of the newly formed web in position to receive a subsequently cut strip. At the same time arm 67 is released upon de-energization of electro-magnet 93 and the trolley 66, which has been re-engaged by the latch 77 upon de-energization of amplifier relay 81, is set for the next subsequent operation.

As previously explained, the original web of the tire-making fabric comprises parallel longitudinal cording indicated at 98, Figures 2 and 5, coated with a rubber which is uncured and in a tacky state. This fabric is delivered generally transversely onto the table 1 by means of the trolley 18. The bias cutting is effected by the knife 52 and the angle of the bias is determined by the position of the table assembly 1 as rotated on its pivot 5, as illustrated in Figure 3. The angle of bias is therefore selected simply by turning the table assembly on its pivot so that its longitudinal dimension cuts across the parallel cording of the fabric stock 9 at the requisite angle, as shown in Figure 2. This angle may be set by a suitable angular scale 99 associated with the pivot 5 and centered on the pivot axis.

To support the table for smooth rotation the end thereof is provided with vertical legs 100 which carry rollers 101 rolling on a track 102. Again this track has associated with it an angular scale 103 to allow the angle of the bias cut to be determined.

The drive motor 47 operating the shaft 46 from which the various wind-ups are driven, as well as the conveyor 96 and rollers 97, is carried on a platform 104, Figure 1, projecting from the legs 100. At the same time the shaft 46 and the magnetic clutches and their various associated mechanism is carried on a bracket 104' extending outwardly from the legs 100 in the longitudinal direction of the table and carrying at the outer end rollers 105 rolling on a track 106. The bracket 104' also carries a conventional automatic wind-up 107 journalled thereon and illustrated generally in diagrammatic form as its details form no part of this invention.

Thus the whole table assembly is easily swingable about its pivot 5 with the various drives and operating mechanisms, with the exception of the trolley 18, moving therewith and maintaining their co-operative relation independent of the inclination of the table.

The trolley platform 16 is fixed relative to the support post 6 of the table assembly 1 and remains stationary as the table is swung, as shown in Figure 2.

Since the fabric stock 9 is cut on a line parallel the longitudinal dimension of the table, the leading edge of the stock web to be picked up by the suction cups 21 of the trolley will also be inclined at the angle or bias determined by the inclination of the table.

To enable the trolley to pick up the leading bias cut edge of the fabric stock 9 the tubular members 19 are adjusted in their clamps 20 to the dotted line position of Figure 2 to engage this cut stock edge as illustrated.

In operation then the trolley 18 picks up the leading stock edge pulling it generally transversely of the table as determined by the inclination of the table until it reaches the left-hand side of the table, as seen from Figure 3, whereupon the trolley releases the stock and comes to a rest, engaging the latch 33. Thereupon knife 52 is operated to bias-cut on a line parallelling the longitudinal direction of the table a strip from the end of the fabric stock 9.

Next, the trolley 66 advances and the plate 11 is swung upwardly when the trolley has advanced to bring its suction cups 69 over the leading edge of the fabric strip, whereupon the light reflection from the table surface 11, due to the light source 79, is cut off from the photo-cell 78. Then the trolley 66 is moved to the left as shown in Figure 6, carrying the fabric strip as held by the suction cups 69 to which suction is applied by the cutting off the light to the photo-cell 78. Upon the leading edge of the bias-cut fabric strip, which has been advanced above the table assembly 1, overlapping the trailing edge of the preceding strip, the light source is cut off through the slots 89 in the turntable 88 from the photo-cell 91, stopping further movement of trolley 66 and causing through electro-magnet 93 depression of arm 67, forcing the tacky rubber of the overlapped strip edges into cohesion. Thereupon the conveyor 96 and feed rollers 97 are operated to advance the new continuous web formed by the cohered bias-cut strips a distance equal to a strip length in the direction of the longitudinal dimension of the table less the overlap of the strip edges, so that the last strip of the new web stops immediately after passing the slots 89 in the turntable 88.

The turntable 88 is rotated to correspond to the rotation of the table assembly 1 so that the line of its slots 89 is parallel to the leading edge of the advancing strips, that is, parallel to the lateral direction of the stock feed by the trolley 18. An angular scale 108 enables the turntable 88 to be accurately set at the desired inclination. At the same time, with the adjustment of the turntable 88 and the tubular members 19 the head 68, of trolley 66 carrying the suction cups 69 is rotated, so that these suction cups are aligned with the turntable slots and the leading strip edge.

It will be appreciated that these adjustments can be carried out easily and quickly and the timing device 23 will ensure periodic operation and will laterally feed the continuous web of stock onto the table, bias-cut a strip therefrom, advance the strip to overlap the trailing edge of the previous strip, force it into coherence therewith to form a web of bias-cut strips and deliver the new web to a take-up.

With a machine such as described it will be noted that the bias-cut is done on a line extending longitudinally of the table assembly 1, and the bias-cut strip is subsequently advanced without changing direction along a line parallelling the line of cut so that it will accurately register with a previously cut strip without requiring any elaborate guides and with a minimum of handling of the tacky fabric material.

While various parts of the mechanisms, such as the cable wind-ups have not been shown for the sake of simplicity, it will be appreciated that details of these constructions are common knowledge in the art.

It will also be appreciated that various details of the machine may be altered without departing from the scope of the appended claims.

What I claim as my invention is:

1. A machine for fabricating a continuous web of individual strips cut from a continuous fabric web, comprising, a longitudinal feed table assembly pivotally supported to rotate about a vertical axis, means for periodically advancing a continuous fabric web generally transversely of said table assembly to advance the end thereof onto said table assembly, knife means carried by said table assembly for severing the end off said fabric web advanced onto said table assembly along a line extending longitudinally of said table assembly, means periodically actuating said knife means following periodic feed of said fabric onto said feed table assembly to cut a strip from the end thereof, means for periodically advancing the severed fabric strip longitudinally of said table assembly in a straight-line path directly from the point of severance to a point overlapping a severed fabric strip previously advanced, means effecting a connection between the overlapping fabric strips when brought into engagement, and means for periodically advancing the fabric strips following their connection in preparation for the advance of a subsequent strip along said table assembly.

2. In a machine for fabricating a continuous web of bias-cut strips cut from a continuous fabric web comprising, a longitudinal table assembly pivotally supported to rotate about a vertical axis, means for feeding the end of a continuous fabric web laterally onto said table adjacent one end thereof, means for bias cutting a strip from the end of said fabric along a line extending longitudinally of said table, means for feeding the bias-cut fabric strip longitudinally of the table in a straight line path parallel to the line of the bias-cut and lapping the forward end of the advancing strip over the trailing end of a previously advanced strip, and means for securing the overlapped strip ends together.

3. In a machine for fabricating bias-cut tire fabric, a longitudinal table assembly pivotally supported to rotate on a vertical axis, means for periodically advancing the end of a web of tire making fabric including an uncured rubber material onto said table adjacent one end thereof along a line generally transversely of the table and acutely inclined to a line extending transversely of the table determined by the pivotal position of said table, means periodically operating to bias-cut a strip from the end of said fabric along a line extending longitudinally of the table following advance of the fabric web onto said table, periodically operated means to advance the bias-cut strip longitudinally of said table, means to interrupt advance of the bias-cut strip upon its contacting a preceding bias-cut strip, means effecting cohesion of the bias-cut strips following contact, and means to periodically advance the cohered bias-cut strips the length of a strip to be positioned for contact by a subsequent strip.

4. A machine for forming a web of bias-cut tire fabric strips comprising, a longitudinal substantially horizontal frame assembly pivoted on a vertical axis adjacent to one end thereof, carrier mechanism operating periodically generally transversely of said frame to feed the end of a web of tire fabric comprising uncured rubber laterally onto said frame, a table surface carried by said frame to support the web end, clamp means periodically operated to clamp the fabric end down onto said table, knife means periodically operated to cut a strip from said fabric end on a line extending longitudinally of said frame, carrier mechanism periodically operated to advance the cut strip longitudinally of said frame to a position with its leading edge overlapping the trailing edge of a previously advanced strip, pressure means operated following advance of said strip to press said overlapped strip edges together to provide cohesion of said strips, and means to advance the web formed by the cohered strips to a position to have the trailing edge receive thereover the leading edge of a subsequent strip.

5. A machine as claimed in claim 4 in which said carrier mechanism operating generally transversely of said frame comprises a trolley, suction devices carried by said trolley, means for moving said trolley in one direction generally transversely of said table to bring said suction devices into contact with the end of the tire fabric web at one side of said longitudinal frame, means periodically operated to retract said trolley to carry the tire fabric web generally transversely across said table, and means operated upon retraction of said trolley to release said suction devices from said web.

6. A device as claimed in claim 4 in which said table surface is pivotally supported at one end on an axis transverse said frame adjacent to the point of lateral feed of said laterally fed web onto said frame, and means are provided to pivot said table surface upwardly as a fabric strip is advanced longitudinally of said frame to raise the leading edge of the advancing strip so that it can be brought to overlap the trailing edge of the previously advanced strip.

7. A machine for forming a web of bias-cut tire fabric strips from a web of tacky tire fabric comprising, a longitudinal frame pivotally supported adjacent to one end to rotate about a vertical axis, a table support surface carried by said frame and terminating short of the end of said frame opposite its pivot, a carrier operating at intervals to carry the end of a longitudinal tire fabric web across said frame at the pivotal end thereof from one side thereof in a fixed direction and deposit said fabric onto said table surface, a knife mechanism operating following advance of said fabric end across said table to bias-cut a strip from the end of the fabric along a line extending longitudinally of said table and inclined to the transverse direction of the longitudinal web in accordance with the pivotal position of said table, a carrier operating at intervals to move the bias-cut strip longitudinally of the frame from its pivotal end and longitudinally of said table on a path parallelling the line of cut to a point where the leading edge of the strip projects beyond the end of said table to overlie the trailing edge of a preceding bias-cut strip, means operating following overlapping the strip ends to press said strip ends into cohesion, means to advance the web formed by the cohered strips upon cohesion thereof, means controlling said latter means to draw the last strip of the latter web off said table and into position to have the leading edge of a subsequent strip advanced longitudinally of said table overlie the trailing edge of said latter web, and timing means controlling the operation of said carriers.

8. A device as claimed in claim 7 in which said table surface is of a light-reflecting material, and said second carrier comprises a carriage operating longitudinally of said table and frame, a scanning device carried by said carriage responsive to light reflected from said table surface, fabric gripping means controlled by said scanning device and actuated by the presence of a fabric strip on said table cutting off light to said scanning device to grip said latter strip, and means actuating said gripping device to release the strip following advance of the leading edge of the strip off the end of said table.

9. A device as claimed in claim 8 in which said fabric gripping means comprise suction devices.

10. A device as claimed in claim 7 in which said knife is mounted on a carriage operating longitudinally of said frame, and means are provided to clamp said fabric adjacent to said knife on a line extending longitudinally of said frame.

11. In a machine for bias-cutting tire fabric in a given horizontal direction, a table assembly extending generally transversely of said direction and pivoted adjacent one end about a vertical axis intersecting the path of web feed, a bias-cutting mechanism for bias-cutting strips from said web, a feed mechanism for feeding the strips longitudinally of said table assembly, and means for effecting cohesion of the edges of subsequent strips, said cutting mechanism, strip feeding mechanism, and means for effecting cohesion of the strips being all carried by said table to maintain their co-operative relation independent of the pivotal position of said table.

12. In a machine for fabricating bias-cut tire fabric, a longitudinal table assembly pivotally supported to rotate about a vertical axis, means operating to feed the end of a web of tire-making fabric onto the table along a line acutely inclined to a line extending transversely of the table, knife means for bias-cutting a strip from the end of said fabric along a line extending parallel to the length of the table, means for advancing the bias-cut fabric strip longitudinally of the table in a direction parallel to the line of bias cut, and means for securing the advanced fabric strip to a previously advanced strip, said table being movable about said vertical axis relative to said means operating to feed the fabric web onto the table whereby the acute inclination between the line of fabric feed onto the table and the line extending transversely of the table can be varied to vary the angle of bias cut.

References Cited in the file of this patent
UNITED STATES PATENTS

| Number | Name | Date |
|---|---|---|
| 800,598 | Seiberling et al. | Sept. 26, 1905 |
| 1,418,365 | Cullen | June 6, 1922 |
| 2,331,342 | Perry | Oct. 12, 1943 |
| 2,384,231 | Bamford | Sept. 4, 1945 |